United States Patent [19]

Ehrlinger et al.

[11] 4,191,072
[45] Mar. 4, 1980

[54] TRANSMISSION WITH HYDRODYNAMIC TORQUE CONVERTER AND RETARDER

[75] Inventors: Friedrich J. Ehrlinger, Friedrichshafen; Horst Böck, Immenstaad, both of Fed. Rep. of Germany

[73] Assignee: Zahnradfabrik Friedrichshafen AG, Friedrichshafen, Fed. Rep. of Germany

[21] Appl. No.: 860,315

[22] Filed: Dec. 14, 1977

[30] Foreign Application Priority Data

Dec. 15, 1976 [DE] Fed. Rep. of Germany ....... 2656669

[51] Int. Cl.² ...................... F16H 47/00; B60K 41/26; F16H 57/02
[52] U.S. Cl. ..................................... 74/732; 192/4 B; 74/606 R
[58] Field of Search .............. 74/730, 731, 732, 15.84, 74/606 R; 192/4 B; 415/DIG. 5

[56] References Cited

U.S. PATENT DOCUMENTS

| | | | |
|---|---|---|---|
| 2,782,658 | 2/1957 | Schaefer et al. | 74/731 X |
| 2,893,267 | 7/1959 | Forster | 74/731 X |
| 3,053,115 | 9/1962 | Cartwright et al. | 74/730 |
| 3,255,642 | 6/1966 | Christenson et al. | 192/4 B X |
| 3,259,218 | 7/1966 | Black et al. | 192/4 B X |
| 3,280,657 | 10/1966 | Holdeman | 74/732 |
| 3,398,818 | 8/1968 | Hensel | 192/4 B X |
| 3,406,579 | 10/1968 | Fisher et al. | 74/15.84 |

FOREIGN PATENT DOCUMENTS

| | | | |
|---|---|---|---|
| 578473 | 6/1959 | Canada | 415/DIG. 5 |
| 1550727 | 7/1969 | Fed. Rep. of Germany | 74/730 |

*Primary Examiner*—Lance Chandler
*Attorney, Agent, or Firm*—Karl F. Ross

[57] ABSTRACT

A transmission which includes a hydrodynamic torque converter provided in the input side of a stepped gear transmission shiftable under load. The stator of a retarder is connected directly to a housing cover and a counterpressure valve, a lubrication pressure valve and a further valve for controlling the flow of the hydrodynamic unit and of the retarder are provided on this housing cover as well.

10 Claims, 3 Drawing Figures

TRANSMISSION WITH HYDRODYNAMIC TORQUE CONVERTER AND RETARDER

FIELD OF THE INVENTION

The present invention relates to a transmission having a plurality of steps or transmission-ratio stages and, more particularly, to a vehicle transmission shiftable under load.

BACKGROUND OF THE INVENTION

It has been proposed heretofore to provide transmissions of the stepped type which are capable of shifting under load, these transmissions generally comprising a housing having an input shaft and an output shaft and gearing, within the housing, in association with respective clutches which, upon selective actuation, establish respective transmission ratios between the input side of the transmission and the output shaft. Each of the clutches is associated with a respective step and by engaging one of the clutches while disengaging all others, the required transmission ratio can be obtained while the output shaft remains under load and the input is continuously applied.

It is also known, in association with such a stepped gear transmission capable of being shifted under load, to provide at the input side a hydrodynamic unit which generally consists of a hydrodynamic clutch or coupling and a torque converter. The torque converter is driven by, for example, an engine of the vehicle and is in turn connected to the input side or shaft of the gear transmission.

At the input side of the gear transmission, in addition, there can be provided a hydrodynamic retarder and the hydrodynamic elements of the arrangement can be supplied with hydraulic fluid or the hydraulic fluid flow paths can be established via one or more control valves.

Transmissions of the aforedescribed type are generally characterized by relatively high displacement rates of hydraulic fluid for the hydrodynamic unit (torque converter) and the retarder.

In a conventional transmission shiftable under load of this type, there is provided an intermediate wall or housing cover as the housing closure between a first housing section (gear transmission chamber) which must be a lubricated space and the second housing section (converter chamber) which generally remains dry, i.e. does not receive free lubricant or oil.

This housing closure portion contains, in the conventional system and usually axially offset from the input shaft, a hydraulic-fluid feed pump while the control valves are disposed in a control housing beneath the gear trains provided in the first housing section.

As a result of this configuration, long flow paths are provided from the pump through the corresponding control valves to the torque converter and retarder. These long flow paths are characterized by large pressure drops and like flow losses so that the filling of the retarder may require an unsatisfactorily long time. With this construction, moreover, it is practically impossible to avoid a large number of locations at which transfer of fluid through the fluid passages can occur between the individual housing sections. This is especially disadvantageous when the main pressure valve is mounted in the housing-closure cover.

It is also known, see for example published German application (Auslegeschrift) DT-AS No. 1 134 903, to provide a hydrodynamic converter which is separated by a partition from a retarder connected thereto, the partition containing the drive for a fluid pressure pump. The stator of the retarder is directly connected to this partition.

Since in this case the control valves are also separated from the torque converter and the retarder in a separate housing, the same disadvantage arises as in the arrangement described above.

OBJECTS OF THE INVENTION

The principal object of the present invention is to provide a more rational construction of a transmission having a torque converter, retarder and gear transmission shiftable under load whereby the disadvantages of earlier systems can be avoided.

Another object of this invention is to provide an improved transmission of the type having a torque converter, retarder and gear transmission shiftable under load such that fluid flow losses are minimized.

It is yet another further object of the invention to provide a transmission of the character described which is free from the drawbacks of earlier systems and which can be constructed more compactly and at lower cost than these earlier systems.

SUMMARY OF THE INVENTION

These objects and others which will become apparent hereinafter, are attained in accordance with the present invention, in a transmission shiftable under load which comprises a hydrodynamic unit, e.g. a torque converter, a gear transmission unit having a plurality of steps shiftable under load and connected to the torque converter, and a hydrodynamic retarder at the input side of the gear transmission. The first housing section containing the stepped gear transmission and the retarder is closed by a cover-like partition-forming member which separates this housing portion from the second housing section containing the hydrodynamic unit. An hydraulic supply pump serving to supply the fluid pressure medium to the hydraulic elements of the transmission is disposed axially directly adjacent the hydraulic unit in this housing, closure or partition which also receives a main pressure valve as well as the fluid passages connecting the pump, the fluid-operating elements and the main pressure valve.

According to the invention, the stator of the retarder is mounted directly on the housing closure or partition or is formed unitarily thereby and this housing closure or partition further contains a torque converter counterpressure valve, a lubrication pressure valve and further valves for controlling the hydraulic fluid flow of the hydrodynamic unit and/or the retarder.

As a result of this construction, flow and leakage loss from the flow passages from the hydraulic pump via the control valves to the hydrodynamic elements (converter or hydrodynamic coupling and retarder) is held as low as possible and, furthermore, only a brief filling time is required for the retarder.

In such a transmission according to the invention it is important that the housing closure member and the partition include not only the pump and the main pressure valve but also all of the control valves needed for the hydraulic medium supply of the converter and the retarder—excluding only a pneumatically actuated retarder control valve—so that the control housing (below the gear transmission) contains only the control valves of the friction clutches establishing the steps of the gear transmission.

According to a feature of the invention, the retarder has its stator axially and directly limited by, i.e. secured to, the housing closure member or partition. In this case it is possible to provide the control valves centrally around the pump and to avoid long passages which might result in flow losses (pressure drops) as well as crossover points which could result in high leakage losses. Furthermore, since the retarder is in part mounted directly upon the housing closure member or partition, extremely short axial flow paths are provided so that the time required for filling the retarder (hydrodynamic brake) is as short as possible.

A housing closure member constructed in accordance with the principles of the invention as described above, surprisingly does not require any additional space in the axial direction and the overall length of the transmission is thus within the dimensions used for prior systems. Naturally, since the space in the region of the housing closure member in the axial direction is occupied by the usual auxiliary drive system, there is some lattitude in increasing the axial width to accommodate the various components which are built into this housing closure member.

Advantageously, one of the retarder control valves built into the housing closure member is the control valve which regulates circulation of the hydrodynamic braking fluid through a cooler.

It has been found to be desirable to cast the housing closure member from metal and to form in the casting process substantially all of the passages, conduits, pump and valve chambers which are required.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
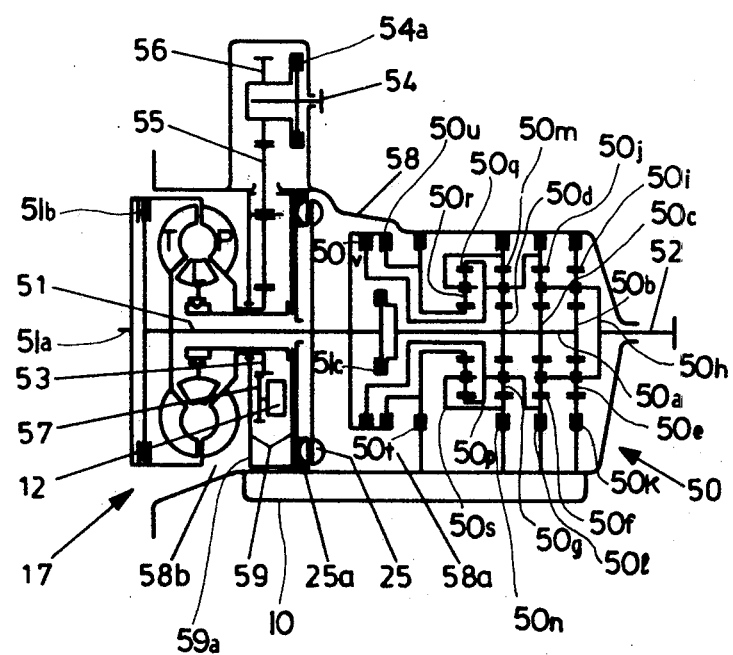
FIG. 1 is a diagrammatic axial cross-sectional view of a transmission embodying the present invention.

The transmission shown in FIG. 1 comprises a stepped gear transmission 50 having an input shaft 51 and an output shaft 52 and is shiftable under load by selective engagement of friction clutches. The input shaft to the system as a whole is represented at 51a and can be connected directly by a friction clutch 51b to the input shaft 51 of the stepped gear transmission.

The input shaft 51 can be connected, in turn, by a friction clutch 51c to a sun gear shaft 50a which carries the sun gears 50b–50d meshing with the planet wheels 50e–50g respectively. The planet wheels 50e and 50f are journaled on a planet carrier 50h affixed to the output shaft and the ring gears 50i and 50j meshing with these planet gears can be immobilized by the friction clutches 50k and 50l. The planet gears 50g mesh with a ring gear 50m which can be immobilized by actuation of a clutch n. Furthermore, the planet gears 50g are mounted on a planet carrier 50p which is connected directly to the ring gear 50j and to a ring gear 50q meshing with planet gears 50r on a planet carrier 50s connected to the ring gear 50m.

The sun gear in mesh with the planet gears 50r is carried by a shaft which can be immobilized by a clutch 50b and can be connected to the input shaft 51 by a clutch 50u. A further clutch 50v can be engaged to connect the ring gear 50z to the input shaft 51.

While all of the various transmission ratios, steps or "gears" of the step transmission 50 need not be described, because the principles thereof are well-known in the art, some of them can be traced readily for illustrative purposes.

For example when either friction clutch 50k or 50l is engaged, the respective sungear 50i or 50j is immobilized and the output shaft 52 is driven by the input shaft 51 at a transmission ratio determined by that of the respective planetary gear assembly 50k, 50e, 50b or 50f, 50l, 50c, corresponding to two speeds.

Friction clutch 50v can be closed to drive sungear 50g or planetary gears 50g to establish further speeds, while closure of clutches 50t and 50n enable still other speeds to be obtained.

At the input side of the changeable-gear transmission 50, there is provided a hydrodynamic converter (torque converter) 17 as well as a retarder 25 or hydrodynamic brake. The rotor of this retarder and the turbine wheel T of the torque converter 17 are connected directly to the input shaft 51 of the gear transmission 50.

The pump wheel P of the torque converter 17 is connected to a gear 53 which meshes via an idler gear 55 with the drive gear 56 of an auxiliary power takeoff drive represented at 54 and having a clutch 54a which is engageable to couple the power takeoff to a drive system. The gear 53 is also in mesh with the pinion 57 of an hydraulic-fluid pump 12 which is built into the partition as will be described in greater detail below and which serves to supply hydraulic fluid to the fluid-actuated clutches of the gear transmission and elsewhere as required.

The housing 58 of the transmission shown in FIG. 1 comprises a first housing section 58a which encloses the speed-changing gear transmission 50 and the retarder, and a second housing section 58b for the torque converter 17, the second housing section 58b being flanged to the block of a prime mover such as an internal-combustion engine. Relative to the first housing section 58a, which must be freely lubricated and hence is referred to as an oil-containing section, the second section 58b remains dry.

The two housing sections 58a and 58b are separated from one another by a housing-closure member or cover, hereinafter referred to as a partition 59, in a fluid-tight manner. Within the axial outer limits of this partition, the gears 53, 55 and 56 as well as the fluid-pressure pump 12 are provided.

The retarder 25 directly adjoins the partition 59 so that its stator vane wheel 25a is limited by and directly formed upon the side of the partition 59 turned toward the first housing section 58a.

Figure 3:
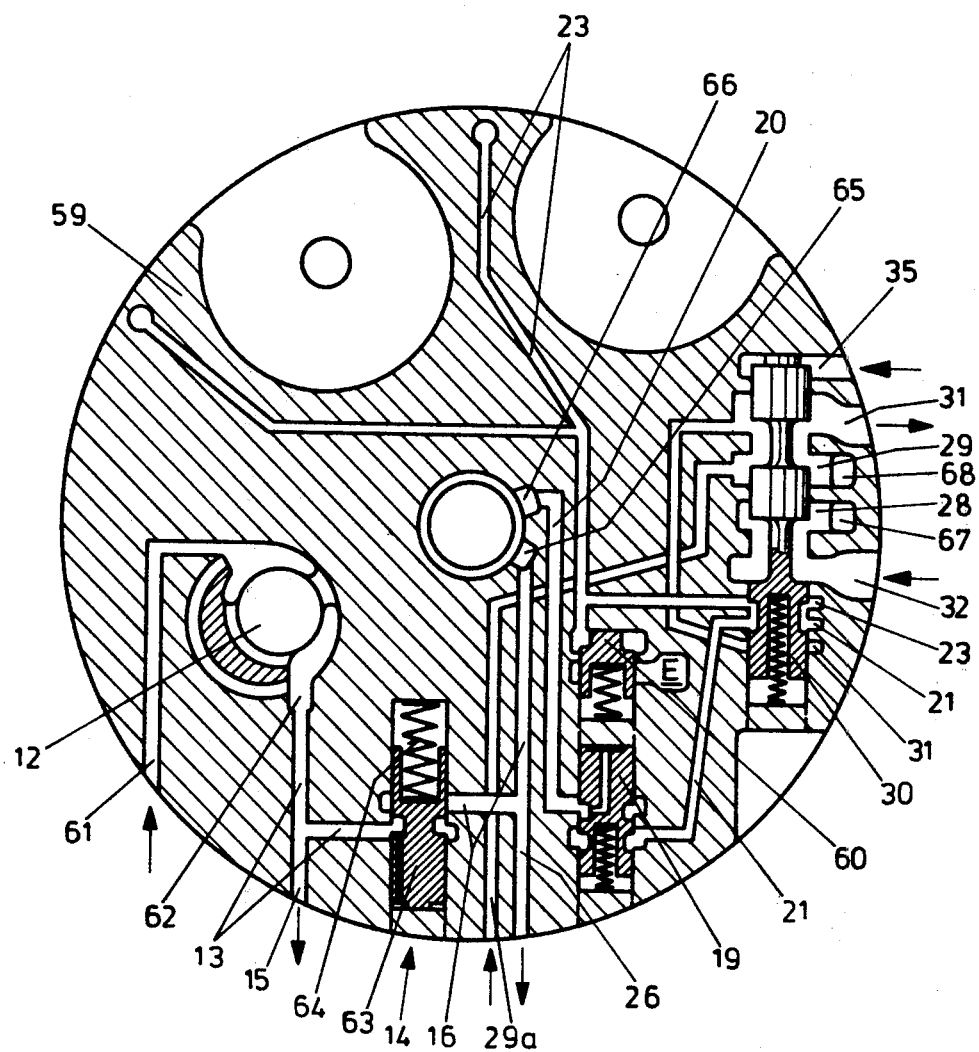
FIG. 3 is a cross-sectional view taken in a plane perpendicular to the axis of the transmission through the housing closure plate thereof.

Apart from the pump 12 and as can be seen in greater detail in FIG. 3, the partition 59 contains a main pressure valve 14, a converter counterpressure valve 19, a lubricating pressure valve 60 and a cooler switchover valve 30, the latter controlling operation of the retarder. In addition, the partition 59 contains the numerous hydraulic-medium passages between these valves, the associated hydraulic-fluid users and the hydraulic pump.

Figure 2:
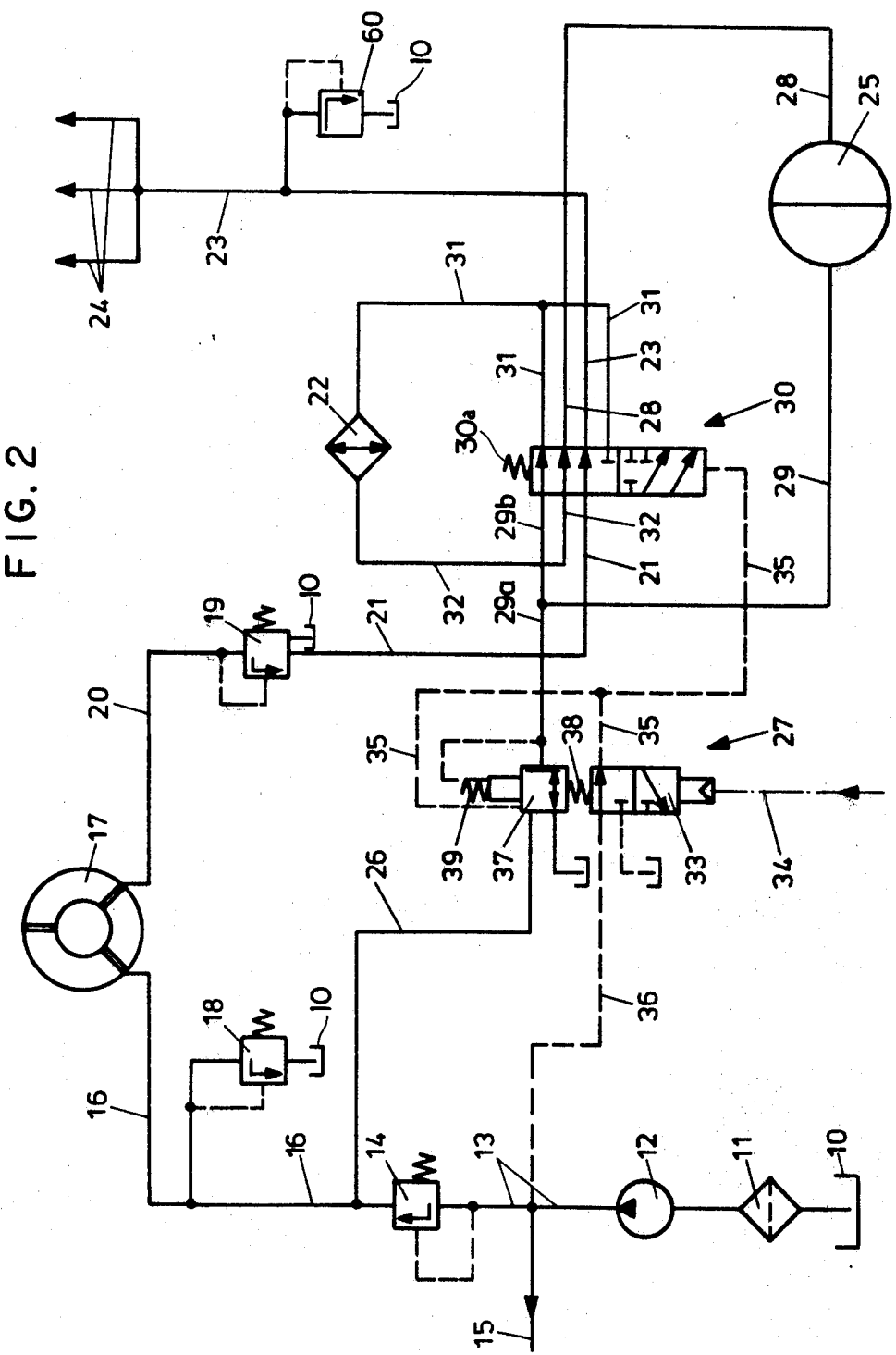
FIG. 2 is a hydraulic control diagram for the transmission of FIG. 1.

The partition 59 is formed as a die-cast member from metal with the various chambers, compartments and passages and especially most of the hydraulic fluid passages, being formed unitarily in the casting process. The hydraulic functioning of the aforedescribed valves is detailed with reference to the hydraulic circuit diagram of FIG. 2.

The hydraulic pump 12 draws fluid from a reservoir 10 formed beneath the first housing section 58a and the partition 59 through a filter 11 which can be of conventional design and also, if desired, built into a partition 59. The hydraulic fluid is displaced to a main pressure line 13 in which a constant pressure is established by the main pressure valve 14 which can be constructed as a pressure relief valve. A branch line 15 ahead of the main pressure valve 14 supplies the switching valves of the friction clutches previously described and selectively actuatable to establish the desired "speed" of the gear transmission. The excess fluid from the valve 14, i.e. that which is not required for operation of the clutches, is applied to the feed passage 16 of the torque converter 17. A further pressure relief valve 18 serves to limit the pressure applied to the converter and is preferably also built directly into the partition 59. Excess fluid from this valve is drained to the reservoir 10.

The pressure relief valve 18 limits the pressure applied via line 16 to the torque converter to a level which can be somewhat higher than the pressure developed in the converter during normal operation by draining any excess above this level to the reservoir.

The converter counterpressure valve 19 which, as has been noted, is also built into the partition 59, and controls the back pressure at the discharge side of the torque converter 17 which has a discharge line 20. This back pressure, naturally, is selected for optimum working of the torque converter and simultaneously effects the pressure in feed line 16.

The hydraulic fluid traversing this valve 19 passes via line 21 through a heat exchanger 22 in normal operation of the transmission, i.e., operation without hydrodynamic braking in a tractive application of the transmission when the vehicle is being propelled under load. From the heat exchanger 22 the fluid flows via an oil pressure line 23 at a constant pressure determined by the lubrication pressure valve 60 to the sites to be lubricated in the gear transmission as represented by the branch lines 24. From the gear transmission the lubricating oil returns to the reservoir 10 and valve 60 which is also built into the partition 59 as noted previously and can be a pressure relief valve draining into the reservoir 10 as well.

The retarder 25 is also supplied by the aforedescribed circuit. To this end, a branch pressure line 26 downstream of the main pressure valve 14 and from the pressure line 16 extends to a control valve 27. The filling and emptying of the retarder is effected by the control valve 27, which is also built into the partition 59, in conjunction with the switchover valve 30.

Upon filling of the retarder, the hydraulic fluid flows from control valve 27 over passages 29a and 29b to a switchover valve 30 and thence via passage 28 to the retarder 25. The passage 28 opens into a radially inner region of the toroidal working chamber of the retarder. Along the periphery of the retarder, where the fluid has a higher pressure than at an inner location when the retarder is operating in a hydrodynamic braking mode, a retarder pressure discharge passage 29 is provided which returns to the passages 29a and 29b to establish a circulation of the retarder fluid through the heat exchanger or cooler 22. In another position of valve 27 the retarder is emptied to the reservoir 10 via passage 29a.

The switchover valve 30 has two positions corresponding to normal tractive operation and braking operation respectively. The position of the valve 30 shown in FIG. 2 corresponds to the braking mode.

Valve 30 controls the passages 31 and 32 of the heat exchanger 22 which are selectively supplied with fluid and/or deliver fluid to the passage 21, the lubricating oil passage 23, the passage 28 leading to the retarder and the return passage 29 therefrom in such manner that during normal forward operation of the vehicle (tractive mode) the line 28 is cut off, line 32 of the heat exchanger is connected to the lubricating oil passage 23 and the line 21 from the converter is connected to the inlet line 31 of the heat exchanger; the return line 29 of the retarder 25 is also blocked.

In the braking mode, the switchover valve 30 connects the retarder feed passage 28 with line 32 of the heat exchanger, the inlet line 31 of the heat exchanger 22 with the return line 29 of the retarder and line 21 from the torque converter 17 with the lubricating passage 23.

Thus the switchover valve 30 during normal tractive operation permits a flow of hydraulic medium from the hydrodynamic unit 17 through the heat exchanger to the lubricating piston while inlet 28 and outlet 29 of the retarder 25 are blocked. In the braking mode only is the retarder 25 connected in a closed circulating path with the heat exchanger 22 while the stream from the converter is delivered directly to the lubricating system 24.

The switchover valve 30 is actuated by a control pressure delivered via line 35 from the control valve 27, this control pressure acting against the force of a spring 30a. In the tractive mode, i.e. normal operation without hydrodynamic brake, the control valve 27 has its position shown in the drawing. As a consequence, the switchover valve 30 assumes a position, as determined by the pressure in line 35, which corresponds to the other position from that illustrated in FIG. 2. In this case, the retarder passages 28 and 29 are blocked while the hydraulic medium flows from the converter via line 21, switchover valve 30, line 31, heat exchanger 22, line 32, again through the switchover valve 30 to the lubricating pressure line 23 and the lubricating system 24.

Upon actuation of the vehicle brake, the switchover valve 30 is shifted into its "retarder-operating" position. In this case the switchover valve 30 establishes a shunt path via the lines 31 and 32 and lines 28 and 29 between the retarder of the heat exchanger so that hydrodynamic braking is effected and the liquid, because of the relatively large flow cross section of the path, circulates rapidly therealong.

The housing closure member or partition 59, as can be seen from FIG. 3, contains the pump 12 which is readily offset from the axis of the transmission and draws hydraulic fluid via the passage 61 through a filter 11, not shown in FIG. 3, to feed it into the main pressure passage 13.

Directly adjacent the pressure or output side 62 of the pump 12, with which the main pressure passage 13 is connected, there is provided the main pressure valve 14 shown at the lower center of the partition 59 in FIG. 3. As a consequence of this orientation, the valve member or piston 63 of the main pressure valve 14 can be accessible from the periphery of the partition and acts against a spring 64 to open a passage to the converter feed passage 16 and thereby maintain a constant pressure as previously described.

While the main pressure passage 13 and the passage 15 to the control valve of the clutches are located in the lower portion of the partition 59 to facilitate connection at the shortest possible path to the clutch control valve located in a control housing below the gear transmission, the line 16 establishes the best possible flow path from the main pressure valve for the hydraulic fluid traversing same to the opening 65 which communicates proximal to the axis with a hollow shaft flanged to the partition 59 and communicating with the stator T of the torque converter. In this manner, the fluid feed to the torque converter is supplied with minimum pressure drop. The fluid from the converter is transmitted via a hollow shaft and the opening 66 in the partition 59 in which the counterpressure valve 19 of the converter is provided as mentioned previously. The fluid is also delivered via passage 21 to the cooler switchover valve 30 which is formed in the partition 59 with an axis parallel to the axes of valves 14 and 19. Line 31 opens generally along the periphery of the partition 59 at an upper location therealong to establish the shortest possible flow path to the heat exchanger which has not been illustrated in FIG. 3. Thus the cooler switchover valve is disposed on the same side of the partition 59, at which the passages 31 and 32 form ports for feeding hydraulic fluid to or returning it from the heat exchanger.

During the braking process, the switchover valve operates to connect the retarder with the heat exchanger and the resulting hydraulic fluid flow corresponds to the shortest possible flow path between these ports 31 and 32 and openings 67 and 68 extending axially through the partition to communicate with the retarder and corresponding to the passages 28 and 29 previously described. Naturally, since the stator 25a of the retarder is located directly upon the wall of the partition 59, an extremely short flow path is thus provided.

The lubricating valve 60 also is found in the partition 59 and has its axis coincident with that of the converter counter-pressure valve 19 and hence parallel to the axis of valves 14 and 30. Surplus lubricant is discharged through the relief passage E to the sump while the valve 60 is connected to the flow passages 23 forming part of the lubricating network mentioned previously.

The retarder control valve 27 is disposed outside the partition 59 because this control valve is actuated pneumatically and a pneumatic connection to the housing closure member or partition 59 would unnecessarily complicate the construction thereof. Since the retarder control valve 27 is connected via line 26 with passages 16, it can be combined in one unit with the converter discharge relief valve 18 although the latter can also be provided within the partition 59.

As has been noted previously, since the main gear transmission also drives a power takeoff shaft via gearing as represented by gears 55 and 56 for example, these can be provided within the partition on the side thereof turned toward the converter 17. The cover plate 59a, which includes these gears within the partition may also serve to close off the passages which may otherwise be formed as grooves in the cast partition. Furthermore, practically all of the passages for delivering the lubricating oil to the gear transmission are here shown also to be provided in the cast member constituting same. Any open cast grooves or channels which would open toward the gear transmission can be closed by the stator of the retarder 25. The system of FIG. 3 has the advantage that at least the most important or significant valves are accessible from the periphery of the partition and hence do not require dismounting of the partition 59 for maintenance or repair.

We claim:

1. A transmission assembly comprising:
    a speed-change gear transmission having an input shaft, an output shaft and selectively actuatable clutches for establishing respective transmission ratios between said input shaft and said output shaft;
    a hydrodynamic torque converter having a driven input element and an output element connected to said input shaft;
    a hydrodynamic retarder having a stator and a rotor and disposed between said torque converter and said gear transmission;
    a common housing for said torque converter, said retarder and said gear transmission, said housing being separated by a partition into a first housing section containing said retarder and said gear transmission and a second housing section containing said converter, said partition directly sealing said sections from one another in a fluid-tight manner and being exposed to the interiors of both said sections, said stator being affixed directly to said partition, said partition exclusively closing off both said sections from one another;
    a hydraulic pump mounted on said partition; and
    a converter counterpressure valve, a lubricating valve and at least one control valve for the converter and the retarder formed directly in said partition, said partition being further formed directly with passages connected to said pump, said retarder, said converter, and said valves.

2. The assembly defined in claim 1, further comprising a converter safety valve formed in said partition connected by at least one of said passages with said converter.

3. The assembly defined in claim 1 wherein said control valve includes a cooler switching valve for selectively connecting said converter and said retarder in hydraulic circuit with a cooler.

4. The assembly defined in claim 3 wherein said control valve has a pair of ports opening directly at the periphery of said partition and connected to said cooler and a pair of ports opening axially along a side of said partition turned toward said gear transmission and communicating with said retarder.

5. The assembly defined in claim 4 wherein said partition is formed unitarily with at least some of said passages as a diecasting body.

6. The assembly defined in claim 5 wherein said counterpressure valve, said lubricating valve and said control valve are formed in said partition with mutually parallel axes.

7. The assembly defined in claim 6 wherein said partition is upright and said passages include a downwardly extending passage communicating with control means for operating said clutches.

8. The assembly defined in claim 7 wherein said partition is formed internally with said pump.

9. The assembly defined in claim 8, further comprising a main pressure valve built into said partition and having an axis parallel to the axes of the other valves therein and connected to said pump by one of said passages.

10. The assembly defined in claim 9, further comprising a power takeoff transmission operatively connected to said input element by a gear train built into said partition.

* * * * *